(12) United States Patent
Matono et al.

(10) Patent No.: US 6,477,019 B2
(45) Date of Patent: Nov. 5, 2002

(54) THIN FILM MAGNETIC HEAD INCLUDING NONMAGNETIC AND MAGNETIC LAYERS WITH SIMILAR MILLING RATES

(75) Inventors: Naoto Matono, Osaka (JP); Tatsuya Shiromoto, Osaka (JP); Tomihito Miyazaki, Osaka (JP)

(73) Assignee: Read-Rite SMI Corporation, Osaka (JP)

( * ) Notice: Subject to any disclaimer, the term of this patent is extended or adjusted under 35 U.S.C. 154(b) by 0 days.

(21) Appl. No.: 09/745,342

(22) Filed: Dec. 20, 2000

(65) Prior Publication Data

US 2001/0000680 A1 May 3, 2001

Related U.S. Application Data

(62) Division of application No. 09/416,366, filed on Oct. 8, 1999.

(30) Foreign Application Priority Data

Oct. 8, 1998 (JP) .......................................... 10-303327

(51) Int. Cl.$^7$ ................................................. G11B 5/39
(52) U.S. Cl. ..................... 360/320; 360/234.7; 360/317
(58) Field of Search .............................. 360/236.5, 126, 360/317, 313, 320

(56) References Cited

U.S. PATENT DOCUMENTS

| | | | |
|---|---|---|---|
| RE35,800 E | * 5/1998 | Chapin | 360/236.5 |
| 6,188,544 B1 | * 2/2001 | Mino | 360/126 |
| 6,346,338 B1 | * 2/2002 | Watanabe | 360/317 |

* cited by examiner

Primary Examiner—A. J. Heinz
(74) Attorney, Agent, or Firm—Burgess & Bereznak, LLP

(57) ABSTRACT

Prevention of the formation of unwanted profiles in the ABS surface by etching of the slider ABS surface, even when gap layers are formed from non-alumina-base nonmagnetic materials differing from the component material of the substrate. Numerous thin film magnetic head elements, consisting of multiple layers including magnetic gap layers composed of nonmagnetic materials, are formed in a lattice array on the surface of a wafer. In the process of formation of these elements, the component materials of the magnetic gap layers existing in the region to be etched in order to form the slider shape are removed in advance. The wafer on the surface of which the elements are formed is cut into individual head blocks, and the surfaces opposing the magnetic recording media, consisting of a cut surface of said head block, are formed into a slider shape by etching.

10 Claims, 7 Drawing Sheets

THIN FILM MAGNETIC HEAD INCLUDING NONMAGNETIC AND MAGNETIC LAYERS WITH SIMILAR MILLING RATES

This is a Divisional of U.S. application Ser. No. 09/416,366, filed Oct. 8, 1999, now pending.

BACKGROUND OF THE INVENTION

1. Field of the Invention

This invention concerns methods of manufacture of magnetic head devices in which a thin film magnetic head element is formed on one face of a slider.

2. Background Information

As has been disclosed in Laid-Open Patent Application Hei8-30944 and Laid-Open Patent Application Hei10-172125, magnetic head devices of the prior art which are mounted in hard disk devices are fabricated by forming numerous thin film magnetic head elements consisting of multiple component layers in a lattice array on a nearly disc-shaped wafer surface of, for example, $Al_2O_3$—TiC, cutting said wafer into individual head blocks, and forming into a slider shape by etching the surface opposing the magnetic recording media consisting of a cut surface.

The aforementioned thin film magnetic head element is formed by vertical layering, using vacuum thin film formation means, of a magnetoresistance effect head (MR head) for reproduction and an inductive head for recording.

Magnetoresistance effect elements, in general, have as principal components a lower magnetic shield layer, lower magnetic gap layer consisting of alumina ($Al_2O_3$), magnetoresistance effect element layer (MR element), electrode layer, upper magnetic gap layer consisting of alumina, and upper magnetic shield layer. Inductive heads have as principal components a lower magnetic pole layer, gap layer consisting of alumina, coil layer, insulating layer, and upper magnetic pole layer. These component head layers are formed by successive layering using vacuum thin film formation techniques.

The magnetic gap layers of each head are exposed to the surface of the head block opposing the magnetic recording media, in order to perform writing to or reading from the magnetic recording media.

With the larger capacities and smaller sizes of hard disk devices in recent years, the magnetic disks which are the magnetic recording media are required to have still higher track densities. In consequence of their characteristics, the MR heads used for reproduction are able to accommodate higher densities than are the inductive heads used for recording; but the following problems arise when raising the track densities of inductive heads.

As shown in FIG. 6, inductive heads of the prior art 41 have a wide lower magnetic pole layer 42, a magnetic gap layer 43 formed by layering on top of said layer 42, and a narrow upper magnetic pole layer 44 formed by layering on top of said gap layer 43; the effective track width is determined by the width of said upper magnetic pole layer 44. Hence in order to raise the track density, the upper magnetic pole layer 44 must be formed with a more narrow width, and a magnetic field must be generated in the narrow area between said upper magnetic pole layer 44 and lower magnetic pole layer 42.

However, as track widths become extremely small, the effect of the lateral leakage magnetic field A from the upper magnetic pole layer 44 becomes too large to be neglected. Hence in order to reduce the leakage magnetic field A as much as possible while maintaining the required magnetic field strength, it is desirable that the lower magnetic pole layer 42 be trimmed as in FIG. 7C, and a trimmed part 45 (protrusion) of the same width as the upper magnetic pole layer 44 be formed, in a construction in which said trimmed part 45 effectively acts as the lower magnetic pole.

After forming the upper magnetic pole layer 44 as shown in FIG. 7A, this trimmed part 45 is formed by patterning the gap layer 43 and lower magnetic pole layer 42 using the upper magnetic pole layer 44 as a mask, as shown in FIGS. 7B and 7C.

In the past, alumina ($Al_2O_3$) has been widely used as the component material of the gap layer 43; but when ion milling is used in patterning to trim the alumina of the gap layer 43 and the lower magnetic pole layer 42, because of the low milling rate of alumina, after milling the shape is tapered, and the upper and lower magnetic poles 44, 45, facing each other across the gap 43, are not of the same width.

On the other hand, in order to make the widths of the upper and lower magnetic poles 44, 45 identical, it has been proposed that reactive ion etching or some other reactive plasma method be used to selectively pattern the gap layer 43 of alumina vertically, after which ion milling is used to pattern the lower magnetic pole layer 42. Because in this method two types of equipment are used—equipment for performing reactive ion etching, and equipment for ion milling—equipment costs are increased.

SUMMARY OF THE INVENTION

A method of manufacturing a magnetic head device is disclosed. In one embodiment, the method includes forming, on a surface of a wafer and in a lattice array, numerous thin film magnetic head elements including of a plurality of component layers including a magnetic gap layer including a nonmagnetic material. The wafer is cut into individual head blocks. The surface included in a cut surface of said head block to oppose a magnetic recording media is formed by etching into a slider shape. The component material of the magnetic gap layer existing in a region in which the etching is to be performed is removed in advance.

BRIEF DESCRIPTION OF DRAWINGS

The present invention will be described

EXPLANATION OF SYMBOLS

Figure 1:
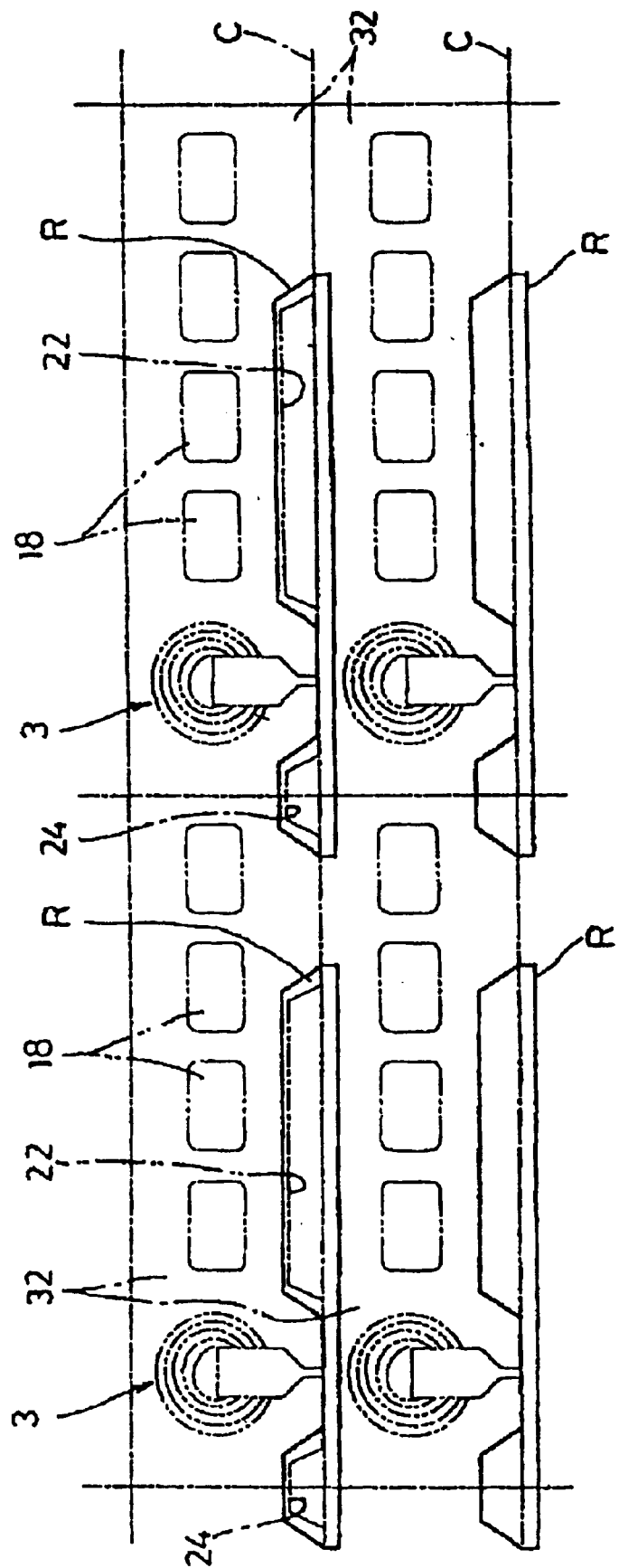
FIG. 1 shows an enlarged plane diagram, explaining the processes of manufacture of a magnetic head device of this invention, showing a real example of a pattern of the magnetic gap layer formed by layering on a wafer.

1 Magnetic head device
2 Slider

3 Thin film magnetic head element
4 Magnetoresistance effect head (reproduction head)
5 Inductive head (recording head)
8 Magnetic gap layer (lower reproduction half-gap layer)
11 Magnetic gap layer (upper reproduction half-gap layer)
13 Magnetic gap layer (recording magnetic gap layer)
20 Surface opposing the magnetic recording media (ABS surface)
31 Wafer
32 Head block

DETAILED DESCRIPTION OF THE INVENTION

In order to use a single type of equipment to pattern the gap layer and the lower magnetic pole layer as discussed earlier, while making the upper and lower magnetic poles the same width, the inventors of this patent developed a method for forming a gap layer of nonmagnetic material with a milling rate essentially equal to the upper magnetic pole layer and lower magnetic pole layer. In other words, the gap layer is formed on top of the lower magnetic pole layer by layering a nonmagnetic material with a milling rate approximately the same as the component material of said magnetic pole layer, and then the electromagnetic coil layer is formed, and plating or other means are used to form the upper magnetic pole layer.

By performing ion milling at an angle of incidence such that the selection ratio (milling rates) of the magnetic pole and gap layers is from 0.9 to 1.1, the gap layer is patterned using the upper magnetic pole as a mask, and thereafter by milling the lower magnetic pole the trimmed part (protruding part) is formed.

As the component material of the gap layer in this method, tantalum pentoxide ($Ta_2O_5$), a beryllium-copper alloy (BeCu), silicon oxide ($SiO_2$), and other materials are appropriate.

By means of this method, using a single equipment setup for ion milling, while performing the gap layer patterning and the lower magnetic pole layer patterning to form the trimmed part (protruding part), the width of the upper magnetic pole can be made the same.

However, if a material of type different from the substrate (wafer) component material ($Al_2O_3$—TiC) is used as the gap layer component material, when reactive ion etching is performed on each head block (slider) to form the slider shape, the aforementioned tantalum pentoxide and other materials have a faster etching rate than does $Al_2O_3$, so that the gap layer part is etched deeply, and an unnecessary profile is formed on the ABS surface of the slider (head block), adversely affecting the slider CSS (contact start stop) and other characteristics.

Hence an object of this invention is to prevent the formation in etched areas of a profile which has a large adverse effect on the CSS and other characteristics, even when a different type of material from the component material of the substrate is used as the gap component material, and even if etching is performed for slider shaping.

In order to achieve the aforementioned objective, in this invention the following engineering measures were devised.

That is, this invention concerns a magnetic head device manufacturing method, including a process of formation, on a wafer surface and in a lattice array, of numerous thin film magnetic head elements, consisting of a plurality of component layers including a magnetic gap layer comprising a nonmagnetic material; a process of cutting said wafer into individual head blocks; and, a process of forming by etching into a slider shape the surface to oppose the magnetic recording media, comprised by a cut surface of said head block; characterized by the removal in advance of component material of the magnetic gap layer existing in the region in which the aforementioned etching is to be performed in the aforementioned thin film magnetic head formation processes. The head block formed into a slider shape becomes the slider used in hard disk devices and other equipment. The aforementioned thin film magnetic head element is formed on the trailing face of the slider, and the magnetic gap layer of said element is exposed to the rail surfaces of the face opposing the magnetic recording media (the ABS face), comprising a magnetic gap for use in recording and reproduction.

By means of the aforementioned magnetic head device manufacturing method, when performing etching for slider shape forming, there is no magnetic gap component material existing in the region to be removed by etching. Hence even in cases where a magnetic gap layer is formed using a non-alumina-base nonmagnetic material, with a wafer consisting of a composite ceramic of $Al_2O_3$ and TiC or some other alumina-base nonmagnetic material used as the substrate, when performing etching to form the slider shape on the surface opposing the magnetic recording media (ABS surface) of the head block (slider), no gap layer appears in the surface of the etched area, so that an unnecessary profile is not formed in the ABS surface by etching, and degradation of the CSS and other characteristics of the flying magnetic head device is prevented.

As the etching method, in addition to reactive ion etching and other dry etching methods, wet etching can also be used. By means of reactive ion etching, chemically active ion groups are accelerated along an electric field, advancing perpendicular to the substrate in a directional chemical etching process that imparts a directionality to the etching; consequently curved-surface shaping is also possible, and the freedom available in shaping the slider ABS surface can be increased.

In addition, if elimination of the component material of the magnetic gap layer is performed over a width exceeding the width of the region to be etched, then the magnetic gap layer no longer appears in the protruding part formed by protection of the mask during etching, that is, in the side wall areas of the ABS surface rails. Thus formation of a subsiding groove in the rail side wall parts due to etching is prevented.

It is desirable that the aforementioned thin film magnetic head element be formed by integrated layering of a magnetoresistance effect head for reproduction and an inductive head (magnetic induction type head) for recording; but this invention can also be applied to magnetic head elements which use an inductive head for both reproduction and recording.

In an MR-inductive integrated head, the magnetic gap layer includes a reproduction magnetic gap layer formed by layering above or below the magnetoresistance effect element film of a magnetoresistance effect head, and a recording magnetic gap layer intervening between upper and lower magnetic poles in an inductive head.

As the component material of the aforementioned reproduction magnetic gap layer, aluminum nitride (AlN) or aluminum-nitrogen oxide (AlNO) can be used. By means of these materials, because thermal conductivity is excellent, dissipation of the heat generated within magnetoresistance effect elements is good, and the thermal reliability of the element is improved. Hence even in cases where output is raised by reducing the stripe height of the magnetoresistance effect element, it is possible to cope with increases in heat generation accompanying rises in resistance value due to narrower stripe heights.

As the component material of the aforementioned recording magnetic gap layer, silicon oxide, tantalum pentoxide, a beryllium-copper alloy, or some other material with nearly the same milling rate as the permalloy (NiFe alloy), FeAl alloy, Co-base amorphous alloy or other upper and lower magnetic pole component material, can be used. By using such material, formation of the trimmed part (protruding part) of the lower magnetic pole of the inductive head can be performed by an ion milling device used for patterning of the recording magnetic gap layer, the track widths of the upper and lower magnetic poles can be made nearly the same, the inductive head can be made to accommodate high track densities, and equipment costs can be reduced.

In this way, in a magnetic head device in which a thin film magnetic head element is provided on the trailing face of the slider, and the surface of the slider opposing the magnetic recording media is formed into a slider shape by etching, the gap layer comprising the magnetic gap of the aforementioned thin film magnetic head element is not exposed to the depression part formed by the aforementioned etching, so that formation in said depression part of a subsiding groove which degrades the CSS and other characteristics is prevented.

The head blocks which are the intermediate products of magnetic head device manufacture having such sliders are formed by layering of a thin film magnetic head element on one end surface, with a surface adjacent to said head layering surface used as the surface opposing the magnetic recording media, and with the magnetic gap of the aforementioned thin film magnetic head element exposed. Said surface opposing the magnetic recording media is formed into a slider shape by etching; an etching area for formation of the aforementioned slider shape is used in which there does not exist the component material of the aforementioned magnetic gap. When the surface of the head block opposing the magnetic recording media is formed into a slider shape, the magnetic gap component material does not exist in the etched part, and so formation proceeds at nearly the same etching rate over the entire etched region, so that formation of an unnecessary profile due to etching is prevented.

Below, embodiments of the invention are explained based on the drawings.

Figure 3:
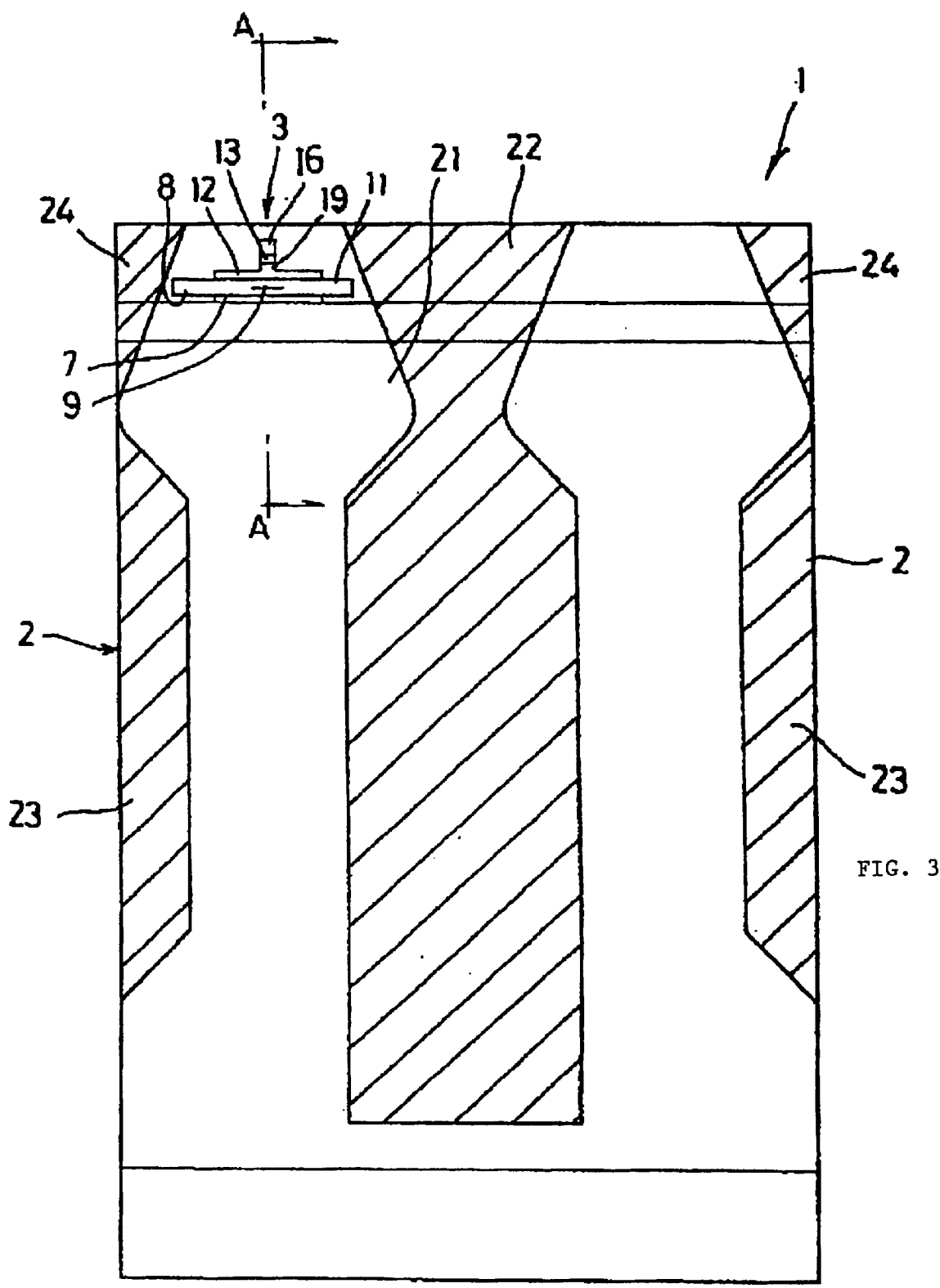
FIG. 3 shows a schematic diagram of the ABS surface of a magnetic head device of a real example of the invention.
Figure 4:
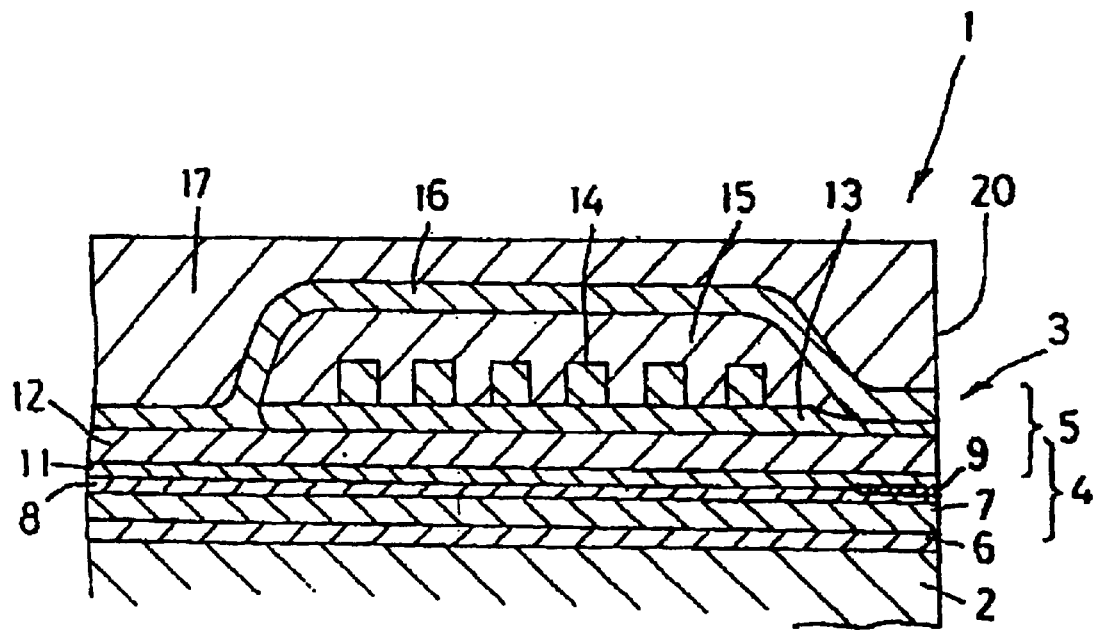
FIG. 4 shows a cross-sectional diagram along line V-V in FIG. 3.
Figure 5:
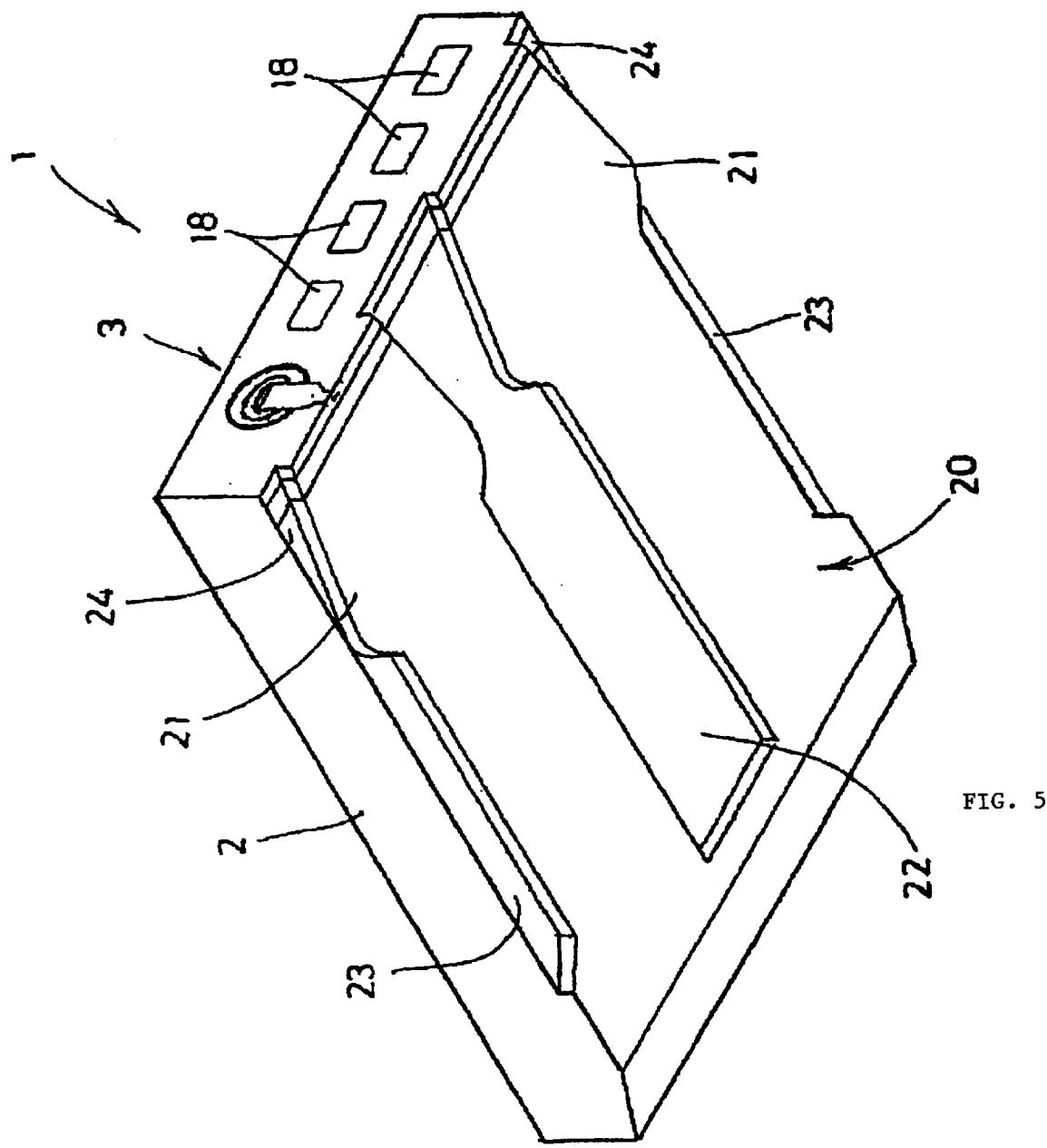
FIG. 5 shows a perspective diagram of the same magnetic head device.
Figure 6:
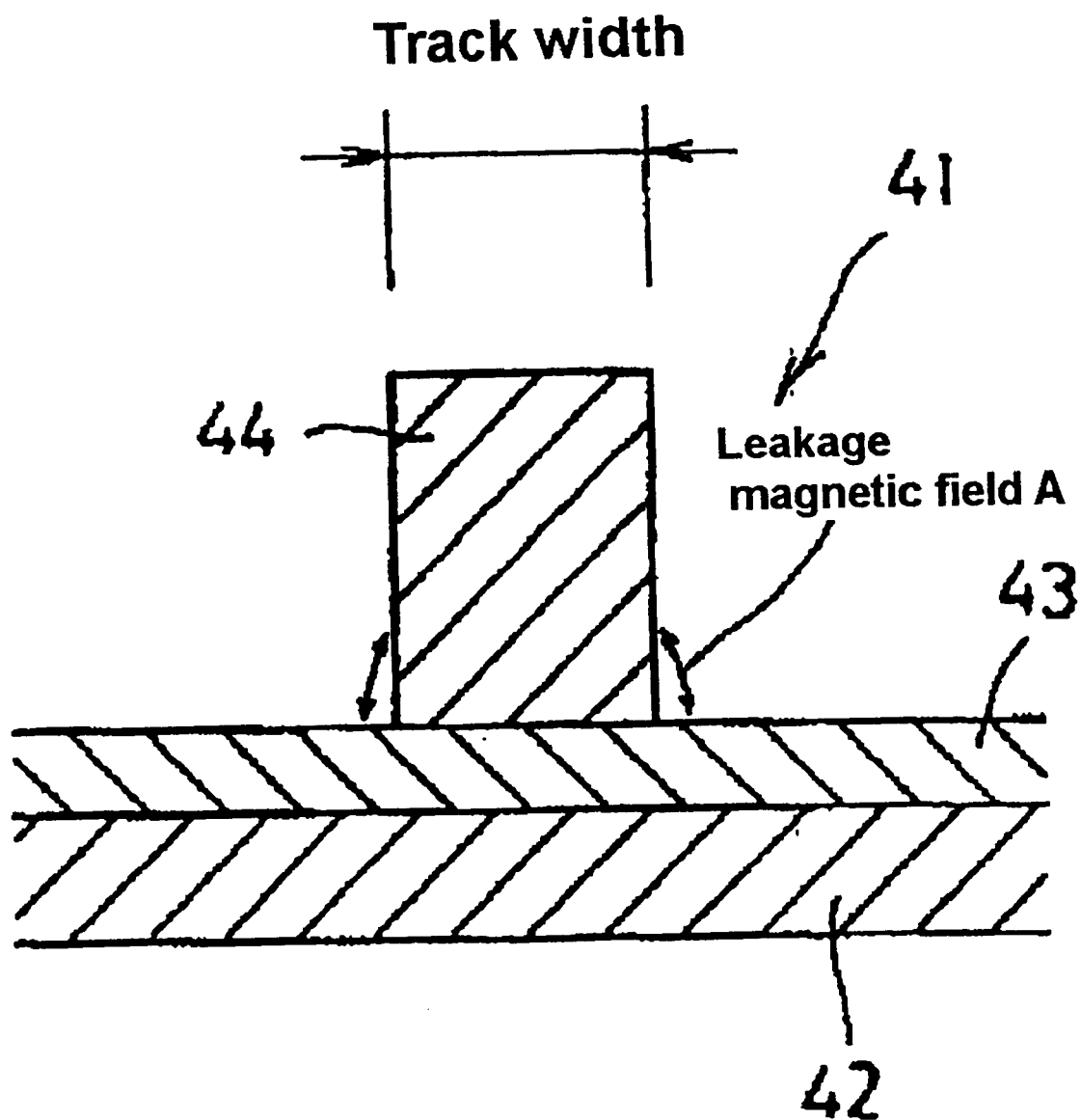
FIG. 6 shows a perspective diagram of the same magnetic head device.
Figure 7A:
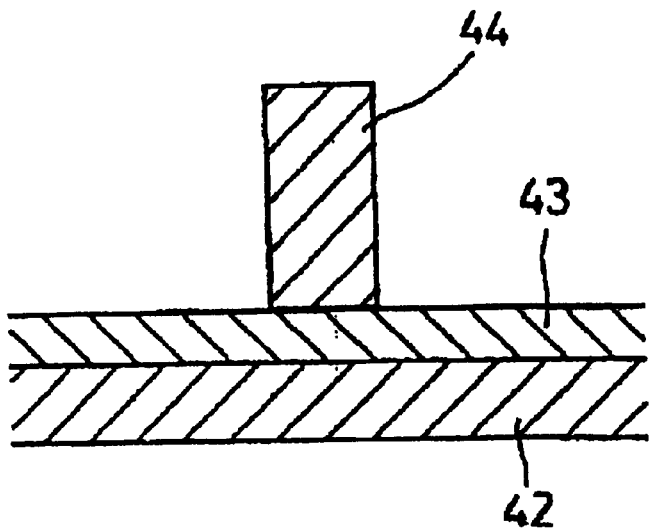
FIGS. 7A–C show cross-sectional diagrams of the magnetic gap part of an inductive head with trimming of the lower magnetic pole layer performed.
Figure 7B:
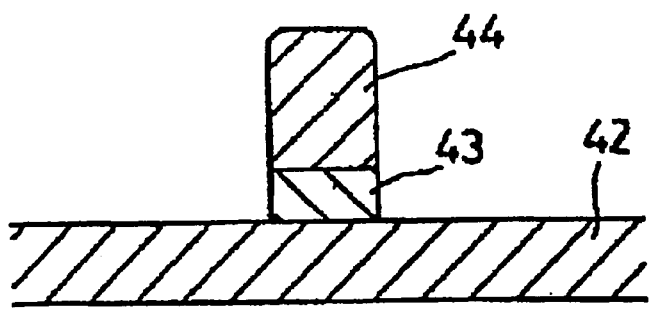
Figure 7C:
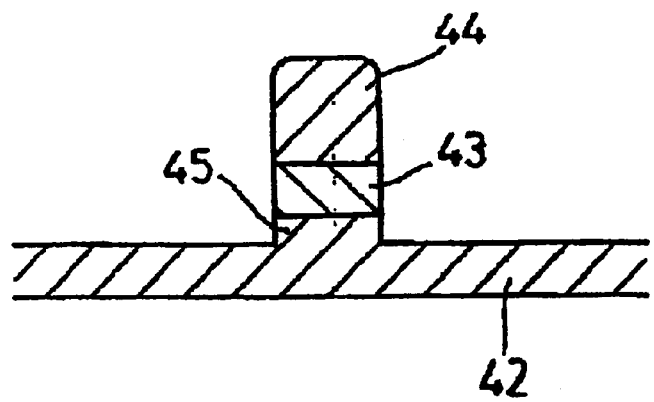

FIGS. 3 through 5 show a flying type magnetic head device 1 manufactured by the method of this invention; initially the construction of said device 1 is explained.

The magnetic head device 1 of this embodiment is comprised of layered formation of a thin film magnetic head element 3 consisting of multiple component layers on the trailing face of a slider 2 (substrate); said element 3 consists of a magnetoresistance effect head 4 for reproduction and inductive head 5 for recording, layered vertically in integrated fashion.

The magnetoresistance effect head 4 consists of a substrate (slider) 2 of an AlTiC ($Al_2O_3$—TiC) or other alumina-base nonmagnetic material (nonmagnetic alloy) on the surface of which is formed by layering an undercoat 6 consisting of a nonmagnetic material, on top of which are layered a low magnetic shield layer 7 of a soft magnetic material, a lower half-gap layer 8 of nonmagnetic material, a magnetoresistance effect element film 9 (dimensions exaggerated in drawing for clarity) the electrical resistance of which changes according to the external magnetic field strength, conductive electrode layers (not visible in this cross section) connected to both ends of said film 9, an upper half-gap layer 11 of nonmagnetic material, and an upper magnetic shield layer 12 of soft magnetic material.

As the component materials of each layer, for example, alumina ($Al_2O_3$) can be used as the undercoat 6; permalloy (NiFe alloy), FeAl alloy, or Co-base amorphous alloy can be used as the magnetic shield layers 7, 12; aluminum nitride (AlN) or aluminum-nitrogen oxide (AlNO) can be used as the magnetic gap 8, 11; and copper can be used as the electrode layers.

As the magnetoresistance effect element 9, a well-known AMR element, a spin-valve element, granular element, or other GMR element can be used. The magnetoresistance of said element 9 changes according to the magnetic field from the magnetic recording media, and by detecting the resistance change, the information magnetically recorded in the media can be reproduced.

The aforementioned inductive head 5 consists of successive layerings of a lower magnetic pole layer 12 of soft magnetic material, a magnetic gap layer 13 of nonmagnetic material, an induction coil layer 14 of a conductive material, an insulating layer 15 of nonmagnetic material covering said coil layer 14, and an upper magnetic pole layer 16 of soft magnetic material. The lower magnetic pole layer 12 of said head 5 consists of a soft magnetic layer which is common with the upper magnetic shield layer of the magnetoresistance effect head 3; by making this layer 12 common to both, the overall film thickness of the element 1 is reduced.

The lower magnetic pole layer 12 and upper magnetic pole layer 16 are connected at the center part of the induction coil 14, and by passing a current through said coil 14 a magnetic field is created between the tips of the upper and lower magnetic poles 12, 16; the action of said magnetic field causes the magnetic moment of the magnetic material layered in the magnetic recording media surface to be reversed, so that information can be recorded.

The aforementioned thin film magnetic head element 3 is covered by a protective layer 17 of a nonmagnetic material, and terminals 18, electrically connected to the two ends of the magnetoresistance effect element and the two ends of the induction coil, are exposed at the surface of the protective layer 17.

In order to accommodate magnetic disks with high track densities, the track width of the upper magnetic pole 16 (the width of the upper magnetic pole layer 16 exposed to the ABS surface) is formed small, and a trimmed part 19, of approximately the same width as the track width of said upper magnetic pole 16, is formed in the lower magnetic pole layer 12.

As the component materials of each of the aforementioned layers, for example, permalloy, FeAl alloy, or Co-base amorphous alloy can be used in the magnetic pole layers 12, 16; tantalum pentoxide ($Ta_2O_5$), beryllium-copper alloy (BeCu) or silicon oxide ($SiO_2$) can be used in the magnetic gap layer 13 and insulating layer 15; and copper can be used in the coil layer 14.

In the magnetic gap layer 13, alumina, or an alloy or ceramic or other material containing alumina or other alumina-base nonmagnetic material, may be used; but alumina is relatively hard, and would not easily be shaped by the ion milling generally used for patterning of the magnetic pole layer 12; hence use of a non-alumina-base nonmagnetic material which is relatively easily milled is desirable. By thus forming the magnetic gap layer 13 of a non-aluminabase nonmagnetic material, both formation of the aforementioned trimmed part 19 and patterning of the magnetic gap layer 13 can be performed using ion milling, so that equipment costs can be reduced through common use of equipment.

By forming the surface 20 (ABS surface) of the aforementioned slider 2 opposing the magnetic disk (magnetic recording media) into a slider shape, it is given a prescribed profile, and the CSS and other characteristics are improved. This slider shape forming is performed by etching removal of parts to form the depression parts 22, 23, 24.

The magnetic gap layers 8, 11 of the magnetoresistance effect head 4 are exposed at the surface of the protruding part 21 of the ABS surface 20 of the slider 2, and this exposed part comprises the reproduction magnetic gap. Similarly, the magnetic gap layer 13 of the inductive head 5 is exposed at the surface of the protruding part 21 of the ABS surface, and this exposed part comprises the recording magnetic gap. On the other hand, none of the component materials whatsoever of the magnetic gap layers 8, 11 are exposed at the depressed parts 22, 23, 24 of the ABS surface 20.

Next, a real example of the method of manufacture of the aforementioned magnetic head device 1 is explained with reference to FIG. 1 through FIG. 3.

First, vacuum thin film formation techniques and patterning techniques using optical exposure are employed to form the aforementioned thin film magnetic head elements 3 in a lattice array by formation of several layers on the surface of a disc-shape wafer (substrate) 31 of AlTiC ($Al_2O_3$—TiC) or other alumina-base nonmagnetic material, as shown in FIG. 3.

In the process of layering of this element 3, the component materials of the magnetic gap layers 8, 11, 13 existing in the regions in which are formed the depressed parts 22, 24 of the ABS surface 20 of the aforementioned slider 2, that is, in the regions of the ABS surface to be etched, are removed in advance.

Figure 2:
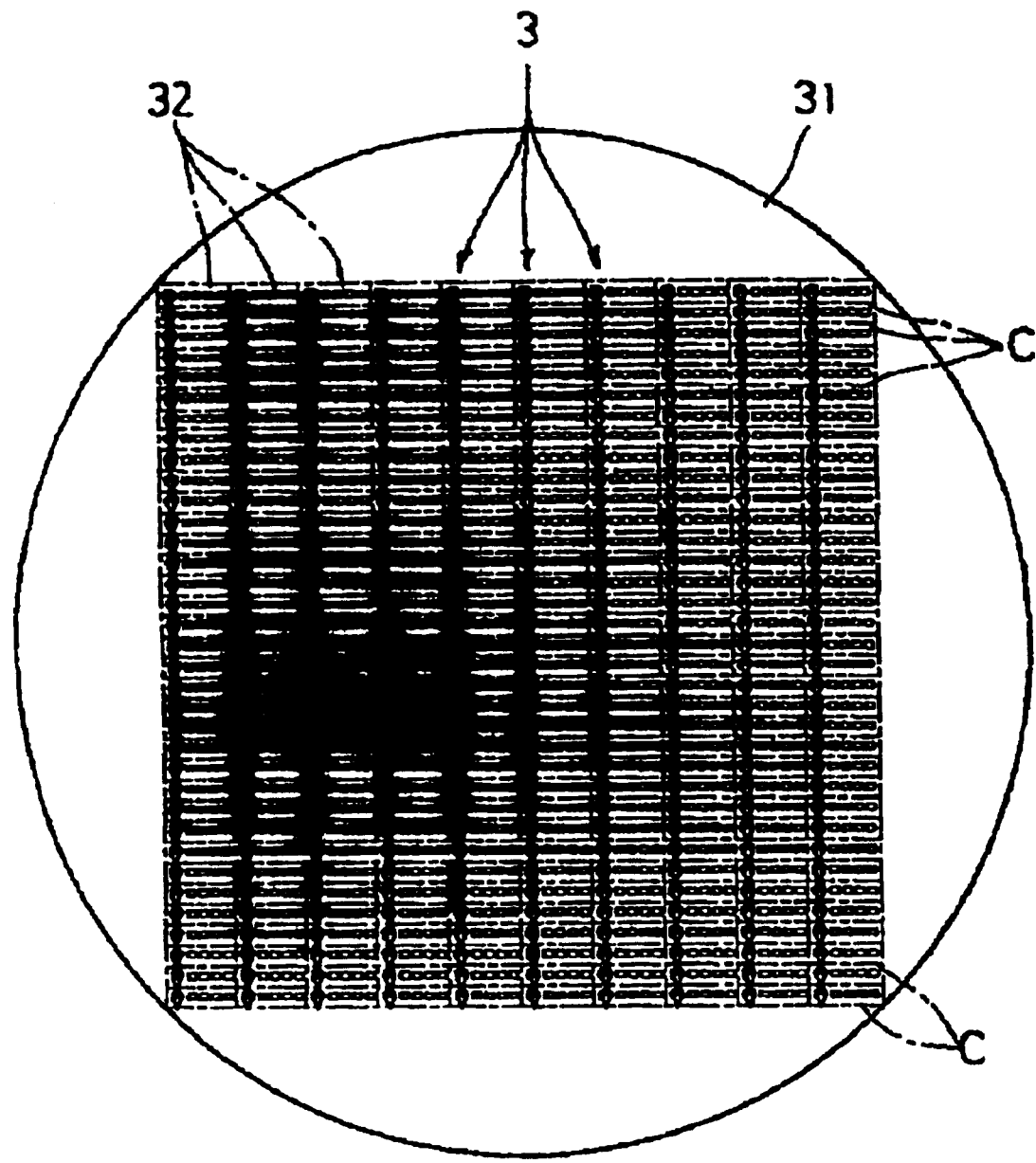
FIG. 2 shows a plane diagram of a wafer on the surface of which are formed numerous thin film magnetic head elements.

Removal of this magnetic gap layer component material can be performed by patterning each of the layers 8, 11, 13 at the time of layered formation of each of the layers 8, 11, 13 as shown in FIG. 1, and removing the removal region R by reactive ion etching (RIE) or by ion milling. Patterning of this removal region R may be performed simultaneously with patterning for other purposes, or can be performed separately.

It is preferable that the removal region R be set over a range wider than the regions of the depressed parts 22, 24 of the slider 2. In the real example shown, the removal region R is set over a range wider than the region to be etched to form the slider shape in the depth direction (vertical direction in the figure) and width direction (horizontal direction in the figure) of the depressed parts 22, 24.

After layered formation of the thin film magnetic head elements 3 and protective layer 17, the wafer 31, on the surface of which numerous elements 3 are formed by layering, is cut into individual head blocks 32 including each of the elements 3 and terminals 18 connecting said elements 3. By forming this head block 32 into a slider shape, the aforementioned slider 2 is fabricated. The cutting into pieces of a horizontal-direction row of head blocks 32 can be performed either after the slider shape forming (etching) described below, or before the etching.

The cut face C at the bottom side of each head block 32 in FIG. 1 and FIG. 3 becomes the surface of the head block 32 opposing the magnetic recording media, that is, the ABS surface 20. After the cutting process, this ABS surface 20 is polished or otherwise machined to flatten the surface, and then slider shape forming is performed to form the prescribed profile shape.

This slider shape forming is performed by reactive ion etching of the prescribed regions (shown as shaded areas in FIG. 3) of the surface 20 of the head block 32 opposing the magnetic recording media which will become the depressed parts 22, 23, 24 of the slider 2. In other words, after forming resist on the region which will become the protruding part 21 of the slider 2, reactive ion etching is performed to remove the prescribed areas to the prescribed depth.

Here the component materials of the magnetic gap layers 8, 11, 13 are removed in advance from the regions to be etched, so that said gap layers 8, 11, 13 do not appear on the surface. Hence even in cases where a non-alumina-base nonmagnetic material, differing from the alumina-base nonmagnetic material which is the component material of the substrate 2, is used as the component material of the gap layers 8, 11, 13, shaping can be performed at nearly the same etching rate over the entire etching region, and the formation of an unwanted profile in the ABS surface 20 by etching can be prevented.

Further, in this embodiment, removal of the component materials of the magnetic gap layers 8, 11, 13 is performed over a width extending beyond the region to be etched, so that the gap layers 8, 11, 13 do not appear either in the side walls of the protruding part 21 of the ABS surface 20, and formation of an unwanted profile in said side walls is prevented.

In particular, by using silicon oxide, tantalum pentoxide, a beryllium-copper alloy or other non-alumina-base nonmagnetic material as the component material of the recording magnetic gap layer 13, both formation of the trimmed part 19 of the lower magnetic pole layer 12 and patterning of the magnetic gap layer 13 can be performed by ion milling, so that equipment costs can be reduced, while at the same time preventing formation of an unwanted profile in the ABS surface by the etching performed to form the slider shape.

By means of this invention, there exists no component material of the magnetic gap layers in the region to be etched, so that even if a magnetic gap layer component material different from the wafer component material is used, formation of unwanted profiles in the ABS surface as a result of the etching used to form the slider shape can be prevented, and thus degradation of the CSS characteristic of the slider can be prevented.

Further, if the magnetic gap layer of the inductive head is formed of silicon oxide, tantalum pentoxide or a beryllium-copper alloy, then the ion milling equipment used to form a trimmed part of the lower magnetic pole layer with the same width as the upper magnetic pole can easily be used for patterning of said magnetic gap layer, so that a single piece of equipment can be used to form the trimmed part, thereby reducing equipment costs and enabling manufacture of an inductive head accommodating high track densities.

What is claimed is:

1. A magnetic head device comprising:
    a slider with a trailing face and an air-bearing surface (ABS) face that opposes a magnetic recording media;
    a thin film magnetic head element comprising a reproduction head disposed on the trailing face, the reproduction head including:
        a lower magnetic pole layer of a first material;
        a gap layer of a second material disposed on top of the lower magnetic pole layer;

an upper magnetic pole layer of a third material disposed above the gap layer, the upper and lower pole layers having substantially the same width;

the first material having a first milling rate and the second material having a second milling rate, the first and second milling rates being essentially equal.

2. The magnetic head device of claim 1 wherein the first and third materials are identical.

3. The magnetic head device of claim 1 wherein the first and second milling rates are in a range from 0.9 to 1.1.

4. The magnetic head device of claim 1 wherein the second material comprises a non-alumina based nonmagnetic material.

5. The magnetic head device of claim 1 wherein the second material is a nonmagnetic material consisting essentially of tantalum pentoxide ($Ta_2O_5$), beryllium-copper (BeCu), or silicon dioxide ($SiO_2$).

6. The magnetic head device of claim 1 wherein the thin film magnetic head element further comprises:

an inductive recording head.

7. The magnetic head device of claim 6 wherein the recording head comprises a magnetoresistive effect head.

8. The magnetic head device of claim 6 wherein the recording head comprises a magnetic inductive type head.

9. The magnetic head device of claim 1 wherein the recording head of the thin film magnetic head element further comprises:

a substrate of a component material that is different from the second material.

10. The magnetic head device of claim 9 wherein the component material comprises $Al_2O_3$.

* * * * *